US008881082B2

(12) United States Patent
Adavani (10) Patent No.: US 8,881,082 B2
(45) Date of Patent: Nov. 4, 2014

(54) FEC DECODER DYNAMIC POWER OPTIMIZATION

(71) Applicant: Vinay Adavani, Bangalore (IN)

(72) Inventor: Vinay Adavani, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 13/719,893

(22) Filed: Dec. 19, 2012

(65) Prior Publication Data

US 2014/0173538 A1 Jun. 19, 2014

(51) Int. Cl.
*G06F 17/50* (2006.01)
*G06F 15/177* (2006.01)
*G06F 9/24* (2006.01)

(52) U.S. Cl.
CPC .......... *G06F 17/505* (2013.01); *G06F 17/5072* (2013.01); *G06F 15/177* (2013.01); *G06F 17/5077* (2013.01); *G06F 9/24* (2013.01); *G06F 17/5054* (2013.01)
USPC ........... 716/116; 716/104; 716/128; 716/121; 703/16; 713/1; 713/2; 713/100

(58) Field of Classification Search
CPC .............. G06F 17/5054; G06F 17/505; G06F 17/5072; G06F 17/5077; G06F 9/24; G06F 15/177
USPC ......... 716/116, 104, 128, 121; 703/16; 713/1, 713/2, 100
See application file for complete search history.

(56) References Cited

U.S. PATENT DOCUMENTS

| | | | | |
|---|---|---|---|---|
| 4,703,435 | A * | 10/1987 | Darringer et al. | 716/103 |
| 5,812,414 | A * | 9/1998 | Butts et al. | 716/103 |
| 6,345,379 | B1 * | 2/2002 | Khouja et al. | 716/115 |
| 6,536,024 | B1 * | 3/2003 | Hathaway | 327/295 |
| 7,555,741 | B1 * | 6/2009 | Milton et al. | 716/101 |
| 7,600,208 | B1 * | 10/2009 | Sharma et al. | 716/120 |
| 7,797,666 | B1 * | 9/2010 | Chiu et al. | 716/116 |
| 7,802,217 | B1 * | 9/2010 | Gopinath et al. | 716/109 |
| 2006/0001444 | A1 * | 1/2006 | Chua et al. | 326/37 |
| 2008/0005716 | A1 * | 1/2008 | Perry et al. | 716/17 |
| 2008/0301604 | A1 * | 12/2008 | Itskovich et al. | 716/6 |
| 2010/0107130 | A1 * | 4/2010 | Bowers et al. | 716/5 |

* cited by examiner

*Primary Examiner* — Phallaka Kik
(74) *Attorney, Agent, or Firm* — Harrity & Harrity LLP; David L. Soltz (57) ABSTRACT

A computing device is configured to analyze a logic gate design having logic gates. The computing device is configured further to identify logic gates that are affected by toggling activity associated with an input of one or more of the logic gates. The computing device is configured further to replace, within the logic gate design, the identified logic gates with different logic gates that are not affected by the toggling activity; and output a new logic gate design based on replacing the identified logic gates with the different logic gates, the application specific integrated circuit, with the new logic gate design, producing a same output as the application specific integrated circuit with the logic gate design, based on same inputs.

20 Claims, 12 Drawing Sheets

FEC DECODER DYNAMIC POWER OPTIMIZATION

BACKGROUND

A communication system may include one or more types of devices that are associated with detecting and correcting errors associated with communications sent between a transmitter and a receiver. A communication system may use a forward error correction process to detect and correct errors. The forward error correction process may include a forward error correction encoder (referred to as "FEC encoder") that encodes a communication (sent from a transmitter) with a pattern of additional bits of information. The communication is sent to a forward error correction decoder (referred to as "FEC decoder"). The FEC decoder may receive the communication and determine whether the pattern of additional bits of information added by the FEC encoder is the same pattern of additional bits of information that is received by the FEC decoder. If the FEC decoder determines that a percentage (e.g., 90%, 95%, 100%, etc.) of the pattern of additional bits of information is correct, then the FEC decoder may remove the pattern of additional bits of information and send the communication to the receiver.

The FEC encoder and/or the FEC decoder may contain multiple integrated circuits, such as an application specific integrated circuit (referred to as "ASIC"). An ASIC may be an integrated circuit used for a particular application, such as encoding communications and/or decoding communications. An ASIC used in the FEC encoder and/or FEC decoder may have a logic gate design that permits the FEC encoder and/or FEC decoder to encode and/or decode communications.

SUMMARY

According to some example implementations, a method, performed by a computing device, may include analyzing a logic gate design, of an application specific integrated circuit, having multiple logic gates; identifying logic gates that are affected by toggling activity associated with an input of one or more of the multiple logic gates; replacing, within the logic gate design, the identified logic gates with different logic gates that are not affected by the toggling activity, where a quantity of the different logic gates is less than a quantity of the identified logic gates; outputting a new logic gate design for the application specific integrated circuit based on replacing the identified logic gates with the different logic gates, where the application specific integrated circuit, with the new logic gate design, may consume less power than the application specific integrated circuit with the logic gate design.

According to some example implementations, a computing device may analyze a logic gate design, of an application specific integrated circuit, having multiple logic gates. The computing device may identify logic gates that are affected by toggling activity associated with an input of one of the multiple logic gates. The computing device may replace, within the logic gate design, the identified logic gates with different logic gates that are not affected by the toggling activity, where the quantity of the different logic gates is less than a quantity of the identified logic gates. The computing device may output a new logic gate design for the application specific integrated circuit based on replacing the identified logic gate with the different logic gates, where the application specific integrated circuit, with the new logic gate design, may produce the same output as the application specific integrated circuit with the logic gate design, based on the same inputs.

According to some example implementations, a computer-readable medium may include a group of instructions which, when executed by one or more processors of a computing device cause the one or more processors to analyze a logic gate design, of an application specific integrated circuit, having multiple logic gates, where the multiple logic gates may include XOR gates and XNOR gates; identify logic gates that are affected by toggling activity associated with an input of one or more of the multiple logic gates; replace, within the logic gate design, the identified logic gates with different logic gates that are not affected by the toggling activity where the quantity of the different logic gates is less than the quantity of the identified logic gates; and output a new logic gate design for the application specific integrated circuit based on replacing the identified logic gate with the different logic gates, where the application specific integrated circuit, with the new logic design, is smaller than the application specific integrated circuit with the logic gate design.

DETAILED DESCRIPTION

The following detailed description of example implementations refers to the accompanying drawings. The same reference numbers in different drawings may identify the same or similar elements.

According to some implementations described herein, an analysis application (e.g., such as an electronic design automation application executing on a computing device) may analyze a logic gate design of an ASIC (e.g., used in an FEC encoder and/or FEC decoder) and reduce the amount of power consumed by the ASIC by improving the logic gate design of the ASIC. The analysis application may reduce the amount of power consumed by the ASIC by reducing the number of logic gates (e.g., XOR gates, XNOR gates, etc.) in the logic gate design. Additionally, by reducing the number of logic gates, the analysis application may improve other characteristics (e.g., area of the logic gate design, number of clock buffers, location of inverters, interconnecting wires, etc.) of the logic gate design that may also result in reducing the amount of power consumed by the logic gate design. While the analysis application may change the logic gate design of the ASIC, the functionality of the ASIC may not change as a result of changing the logic gate design.

Figure 1:
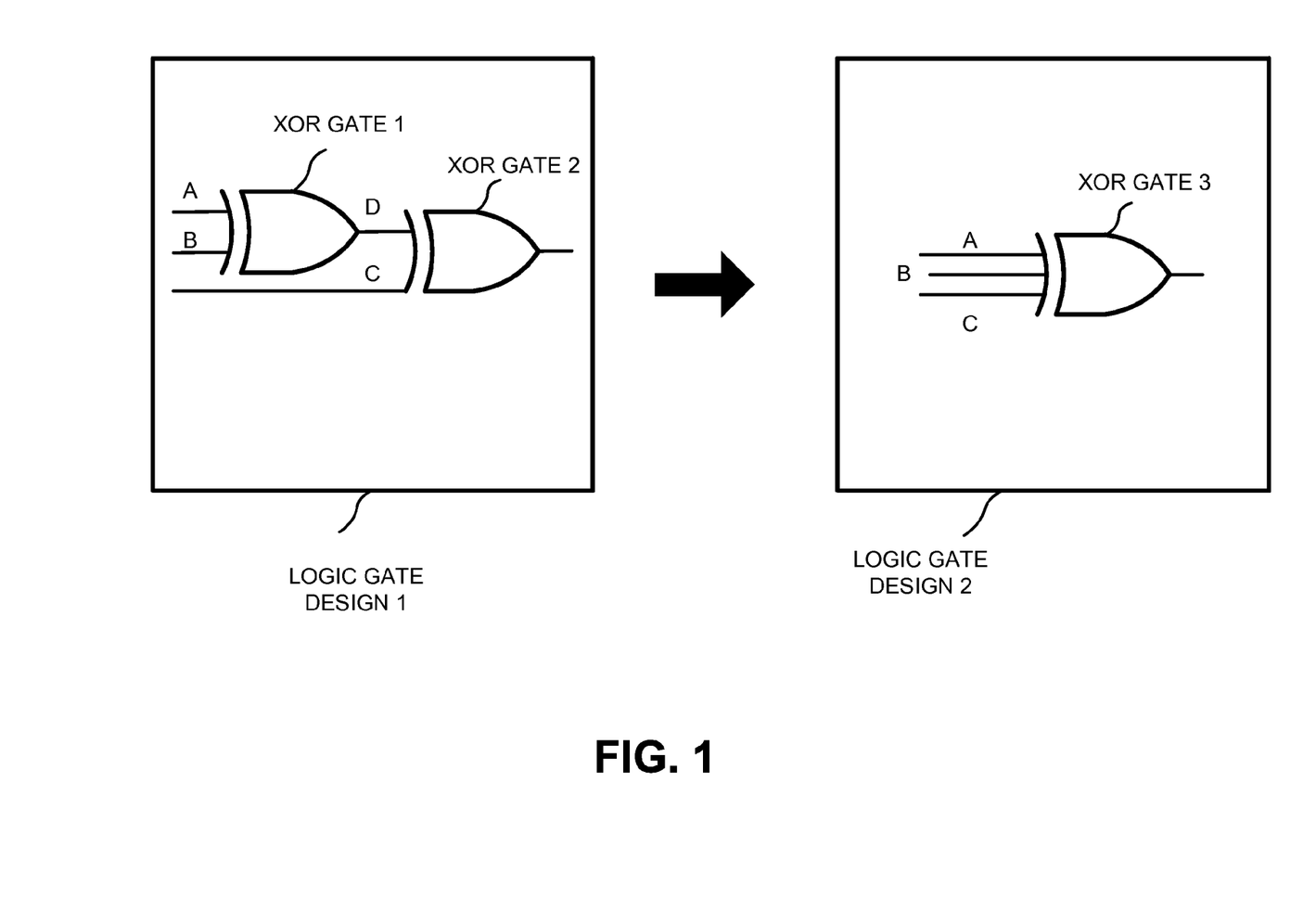
FIG. 1 is a diagram of an overview of an example implementation described herein.

FIG. 1 shows a logic gate design 1 and a logic gate design 2. Assume that logic gate design 1 is a portion of a logic gate design for an ASIC that may be used in a FEC encoder and/or FEC decoder. The logic gate design may have multiple logic gates that may number in the hundreds, thousands, millions, or any other amount. Assume that a gate synthesis application (e.g., executing on a computing device) generates logic gate design 1 based on design parameters (e.g., function of the logic gate design, size of area of the ASIC that will use the logic gate design, operating voltages, operating frequency, etc.) entered by a user of the computing device. As shown in FIG. 1, logic gate design 1 shows XOR gate 1 and XOR gate 2. XOR gate 1 receives two inputs, A and B. Assume that input A and input B are received from a first flip-flop and a second flip-flop (not shown in FIG. 1), respectively. XOR gate 2 receives input C and the output of XOR gate 1 (input D). Assume that input C is received from a third flip-flop. Assume that all three of the flip-flops receive a signal from a clock that results in the flip-flops sending inputs to the XOR gates. Assume that the toggling of input A and/or input B (e.g., the input value switching from 1 to 0, 0 to 1, etc.) causes a toggling of the output of XOR gate 1. The toggling of input A or input B results in power consumption by XOR gate 1. Additionally, since input D (i.e., the output of XOR gate 1) is affected by the toggling of input A or input B, this may result in power consumption by XOR gate 2.

Assume that the gate synthesis application sends logic gate design 1 to an analysis application (executing on the computing device). The analysis application may analyze logic gate design 1 and may determine that the number of inputs (and the logic gates), associated with the toggling activity with input A and/or input B are consuming power that can be reduced by replacing the two XOR gates with one XOR gate.

The improvement of logic gate design 1, by the analysis application, is shown, in FIG. 1, as logic gate design 2. Logic gate design 2 has XOR gate 3 with three inputs, A, B, and C. The three inputs are still being sent from the three different flip-flops. However, because the number of inputs associated with the toggling is reduced (input D is eliminated) and the number of logic gates are reduced, the amount of power consumed (associated with inputs that are affected by toggling) by logic gate design 2 is less than the amount of power consumed by logic gate design 1.

As a result, the amount of power used by the logic gate design may be reduced without changing the logic gate design's functionality. Reducing the number of logic gates may also reduce power consumption (e.g., by reducing total gate nodal capacitance, capacitance, operating frequency, square of input operating voltage, etc.) by reducing the need for wiring, clock buffers, and/or other components associated with the logic gate design. Additionally, using fewer logic gates in the logic gate design may reduce the area associated with a logic gate design and may reduce the physical size of the ASIC. This may result in additional financial cost savings to manufacture the ASIC since less materials may be required to produce a smaller-sized ASIC.

Figure 2:
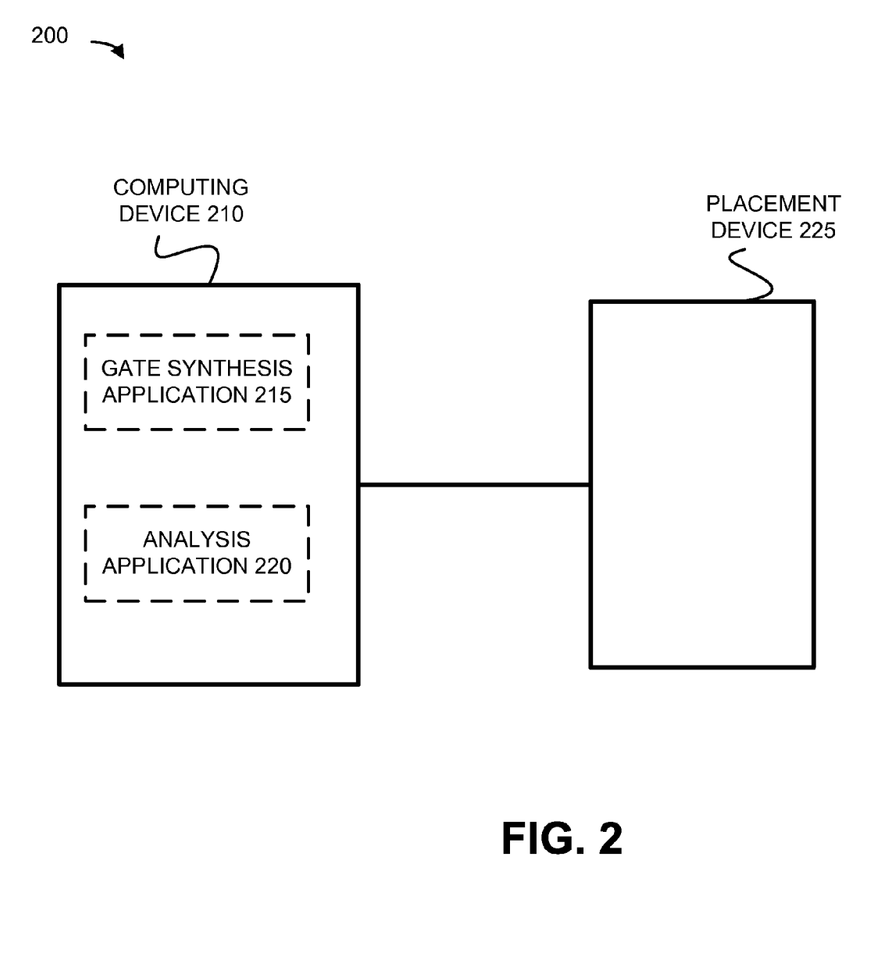
FIG. 2 is a diagram of an example environment in which systems and/or methods described herein may be implemented.

FIG. 2 is a diagram of an example environment 200 in which systems and/or methods described herein may be implemented. FIG. 2 shows a computing device 210, a gate synthesis application 215, an analysis application 220, and a placement device 225.

Devices of environment 200 may interconnect via wired connections, wireless connections, or a combination of wired and wireless connections using one or more types of networks (e.g., a local area network (LAN), a wide area network (WAN), the Internet, an intranet, and/or other types of networks).

Computing device 210 may include one or more devices that are able to execute applications (e.g., electronic design automation application) to generate logic gate designs and/or applications that can improve logic gate designs. For example, computing device 210 may include a personal computer, a laptop, a server, a workstation, and/or any other type of computing device.

Gate synthesis application 215 may be an application that generates a logic gate design for a chip. Gate synthesis application 215 may receive information from a user using computing device 210. The user may enter information (e.g., using high level abstract design language) into gate synthesis application 215 by using a register transfer level language (e.g., hardware description language (referred to as "HDL"), VHSIC hardware description language (referred to as "VHDL"), Verilog, and/or another types of RTL language). Gate synthesis application 215 may translate the RTL language into a logic gate design language and generate a logic gate design.

Analysis application 220 may be an application that receives a logic gate design from gate synthesis application 215 and improves the logic gate design by reducing the amount of power consumed by the logic gate design. Analysis application 220 may analyze the logic gate design and adjust the number of logic gates in the logic gate design and/or other characteristics of the logic gate design to reduce the amount of power used by a logic gate design.

Placement device 225 may be a device that receives a logic gate design from computing device 210 and generates a layout of the physical components of the logic gate design. The layout may include how different physical components (e.g., transistors, diodes, capacitors, logic gates, etc.) of the logic gate design are connected with other physical components of the logic gate design. In some implementations, placement device 225 may generate a physical ASIC based on the layout. Placement device 225 may be a part of computing device 210 or may be a separate device from computing device 210.

Figure 3:
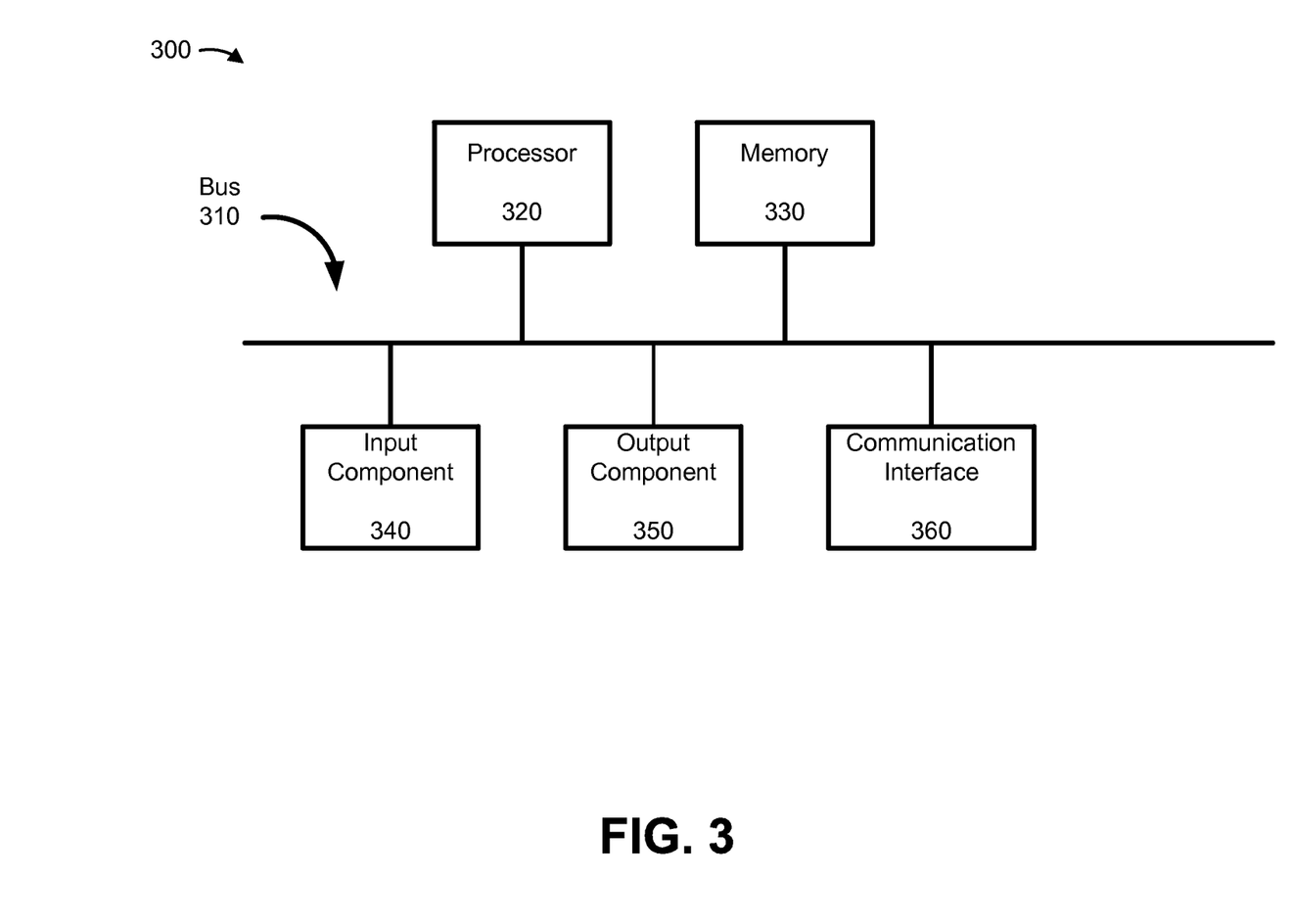
FIG. 3 is a diagram of example components of one or more devices of FIG. 2.

FIG. 3 is a diagram of example components of a device 300. Device 300 may correspond to computing device 210 and/or placement device 225. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing logic (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or any type of dynamic or static storage device (e.g., a flash, magnetic, or optical memory) that stores information and/or instructions for use by processor 320.

Input component 340 may include a component that permits a user to input information to device 300 (e.g., a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include any transceiver-like mechanism, such as a transceiver and/or a separate receiver and transmitter, that enables device 300 to communicate with other devices and/or systems, such as via a wired connection, a wireless connection, or a combination of wired and wireless connections. For example, communication interface 360 may include a mechanism for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single storage device or memory space spread across multiple storage devices.

Software instructions may be read into memory 330 from another computer-readable medium or from another device via communication interface 360. When executed, software instructions (e.g., electronic design automation application software) stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components illustrated in FIG. 3 is provided for explanatory purposes. In practice, device 300 may include additional components, fewer components, different components, or differently arranged components than those illustrated in FIG. 3. Additionally, or alternatively, each of computing device 210 and/or placement device 225 may include one or more devices 300 and/or one or more components of device 300.

Figure 4:
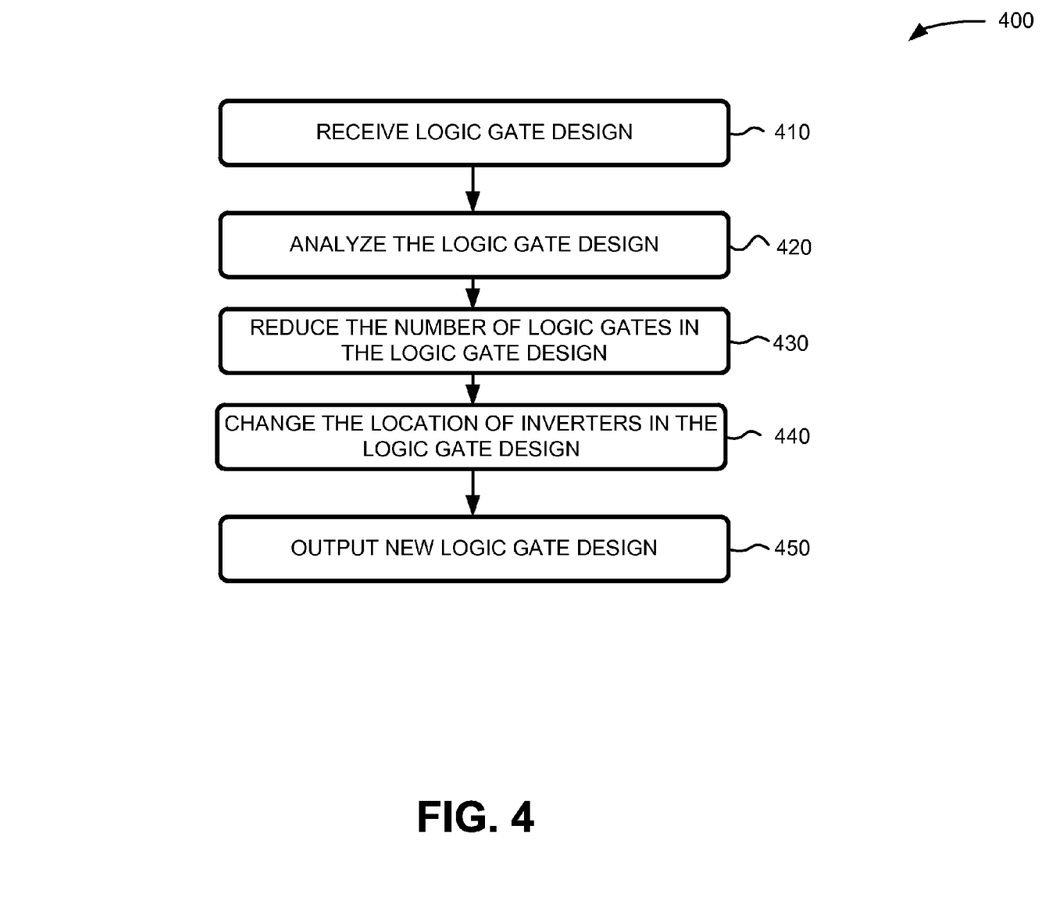
FIG. 4 is a flow chart of an example process that may be performed by a device of FIG. 2.

FIG. 4 is a flow chart of an example process 400 that may be performed by computing device 210. In some other implementations, one or more blocks of process 400 may be performed by placement device 225.

Process 400 may include receiving a logic gate design (block 410). For example, analysis application 215 (executing on computing device 210) may receive a logic gate design from gate synthesis application 215. Gate synthesis application 215 may receive instructions from a user (of computing device 210) who is using gate synthesis application 215 to create a logic gate design for an ASIC. The user may use a RTL language (e.g., VHDL, verilog, etc.) to create parameters of the logic gate design by entering commands into gate synthesis application 215 with the RTL language. Gate synthesis application 215 may translate the RTL language into a gate design language so that gate synthesis application 215 may use modules from a library of modules to generate a gate design associated with the parameters entered by the user.

The modules may determine various characteristics of the logic gate design, such as fan-out, transitions, capacitance, cell degradation, operating frequency, operating voltage, timing critical paths, and/or other characteristics to generate a logic gate design based on the user's inputs.

Figure 5A:
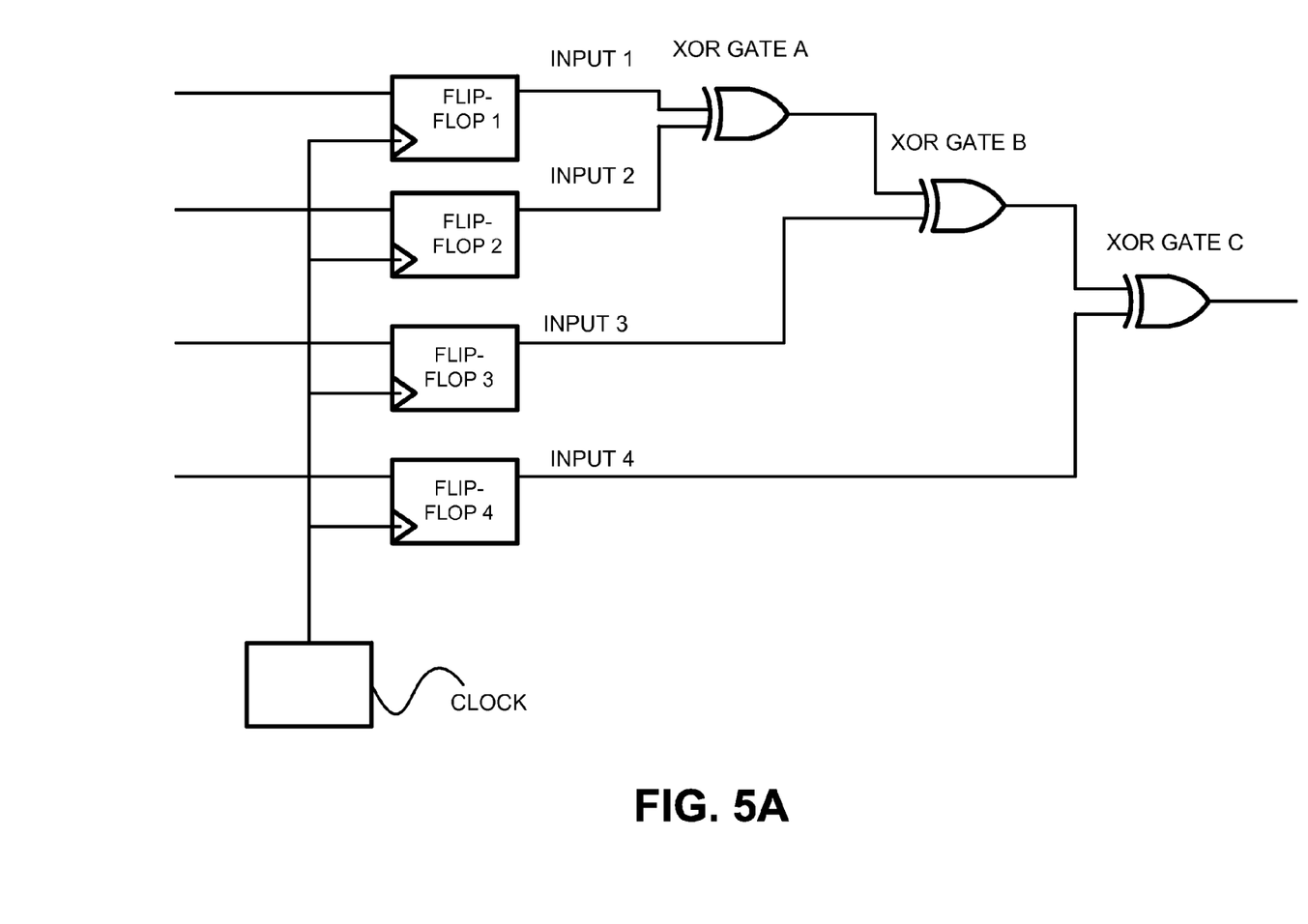
FIG. 5A is a diagram of an example logic gate design.

FIG. 5A shows an example of a portion of a logic gate design that may be generated by gate synthesis application 215. In practice, the logic gate design may have more than a million logic gates. As shown in FIG. 5A, XOR gate A may receive input 1 from flip-flop 1 and input 2 from flip-flop 2; XOR gate B may receive input 3 from flip-flop 3 and the output of XOR gate A; and XOR gate C may receive input 4 from flip-flop 4 and the output of XOR gate B. The flip-flops may be controlled by a clock. The clock may send clock signals to the flip-flops and the flip-flops may generate outputs based on the clock signals. If, for example, input 1 is toggled, this may affect the output of XOR gate A. Additionally, since XOR gate B receives the output of XOR gate A, XOR gate B may also be affected by the toggling of input 1. Additionally, since XOR gate C receives the output of XOR gate B, XOR gate C may also be affected by the toggling of input 1. Toggling one input may result in multiple logic gates switching their respective outputs and may result in the active logic gates consuming power.

Figure 5B:
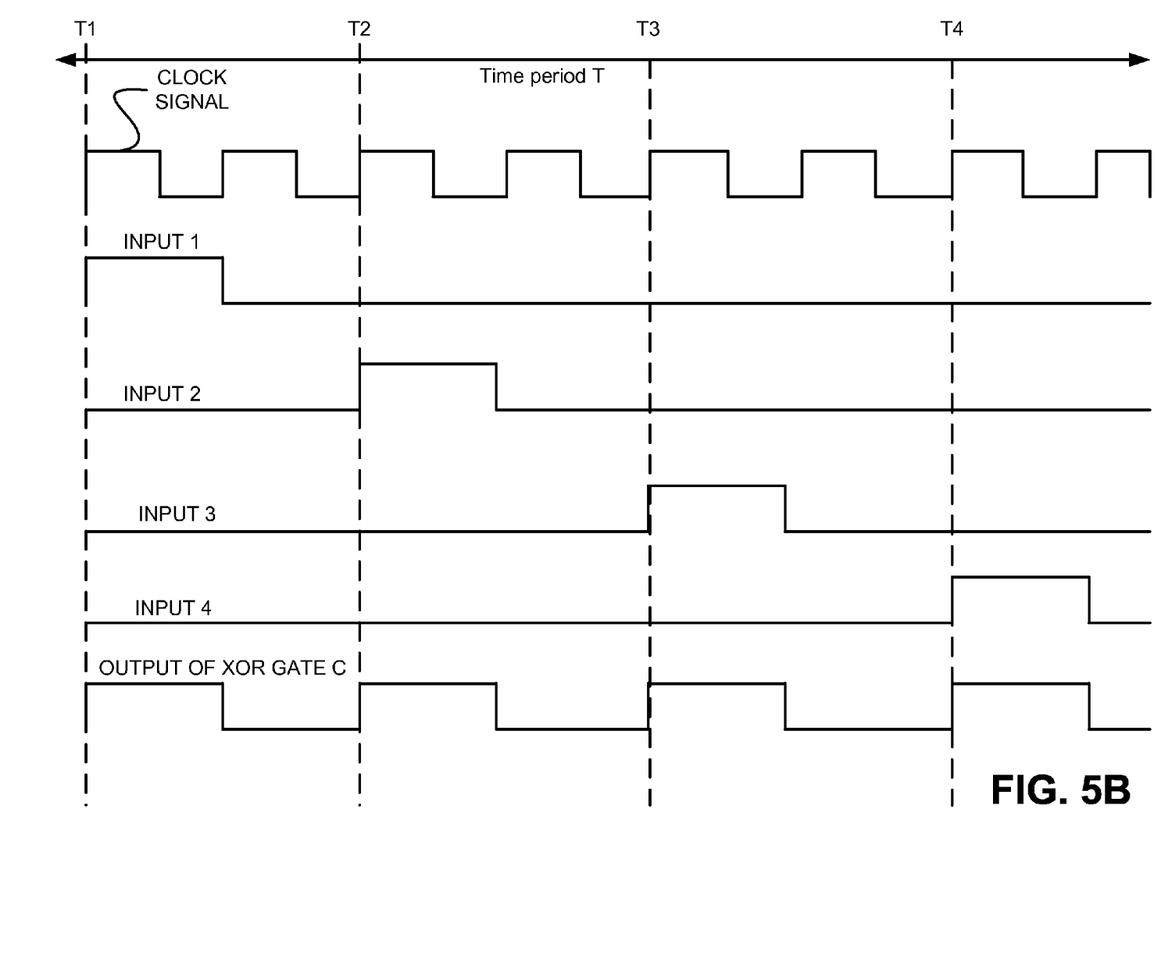
FIG. 5B is a signal diagram that may be generated by the example logic gate design of FIG. 5A.

FIG. 5B is a signal diagram that may be performed by the example logic gate design of FIG. 5A. As shown in FIG. 5B, a clock may be outputting a clock signal over a time period T. The clock signal may, for example, be provided to each of the flip-flops described with regard to FIG. 5A. As shown in FIG. 5B, flip-flop 1 may send a high input 1 to XOR gate A at time T1 and at a low input 1 at times 2, 3 and 4; flip-flop 2 may send a high input 2 to XOR gate B at time T2 and a low input 2 at times T1, T3, and T4; flip-flop 3 may send a high input 3 to XOR gate C at time T3 and a low input 3 at times T1, T2, and T4; and flip-flop 4 may send a high input 4 to XOR gate 4 at time T4 and a low input 4 at times T1, T2, and T3.

Since XOR gate C may be affected by input 1, input 2, input 3, and/or input 4 at different times over the time period T, as shown in FIG. 5B, XOR gate C may be constantly toggling during the time period T. This may result in XOR gate C consuming power that is associated with XOR gate C being repeatedly toggling over the time period T.

Returning to FIG. 4, process 400 may include analyzing the logic gate design (process 420). For example, analysis application 220 may analyze the logic gate design and may determine the location and number of inputs that are associated with toggling activity in the logic gate design. Additionally, analysis application 220 may analyze the toggling activity associated with an input into one XOR gate and/or XNOR gate and determine how toggling the input may affect other XOR gates and/or XNOR gates. Additionally, analysis application 220 may determine the location of XOR gates and/or XNOR gates (that are affected by toggling activities) and determine whether the logic gates could be replaced with a smaller quantity of XOR gates and/or XNOR gates with a greater number of inputs. Additionally, analysis application 220 may analyze the relationship between different XOR gates and/or XNOR gates that are affected by toggling activities and determine whether the XOR gates and/or XNOR gates can be reduced.

Process 400 may include reducing the number of logic gates in the logic gate design (block 430). For example, analysis application 220 may determine, based on the analysis (described with regard to block 420) that the number of XOR gates and/or XNOR gates can be reduced. FIGS. 6A-6D are examples of analysis application 220 reducing the number of XOR gates and/or XNOR gates in logic gate designs. Assume for FIGS. 6A-6D that each input is associated with a different flip-flop.

Figure 6A:
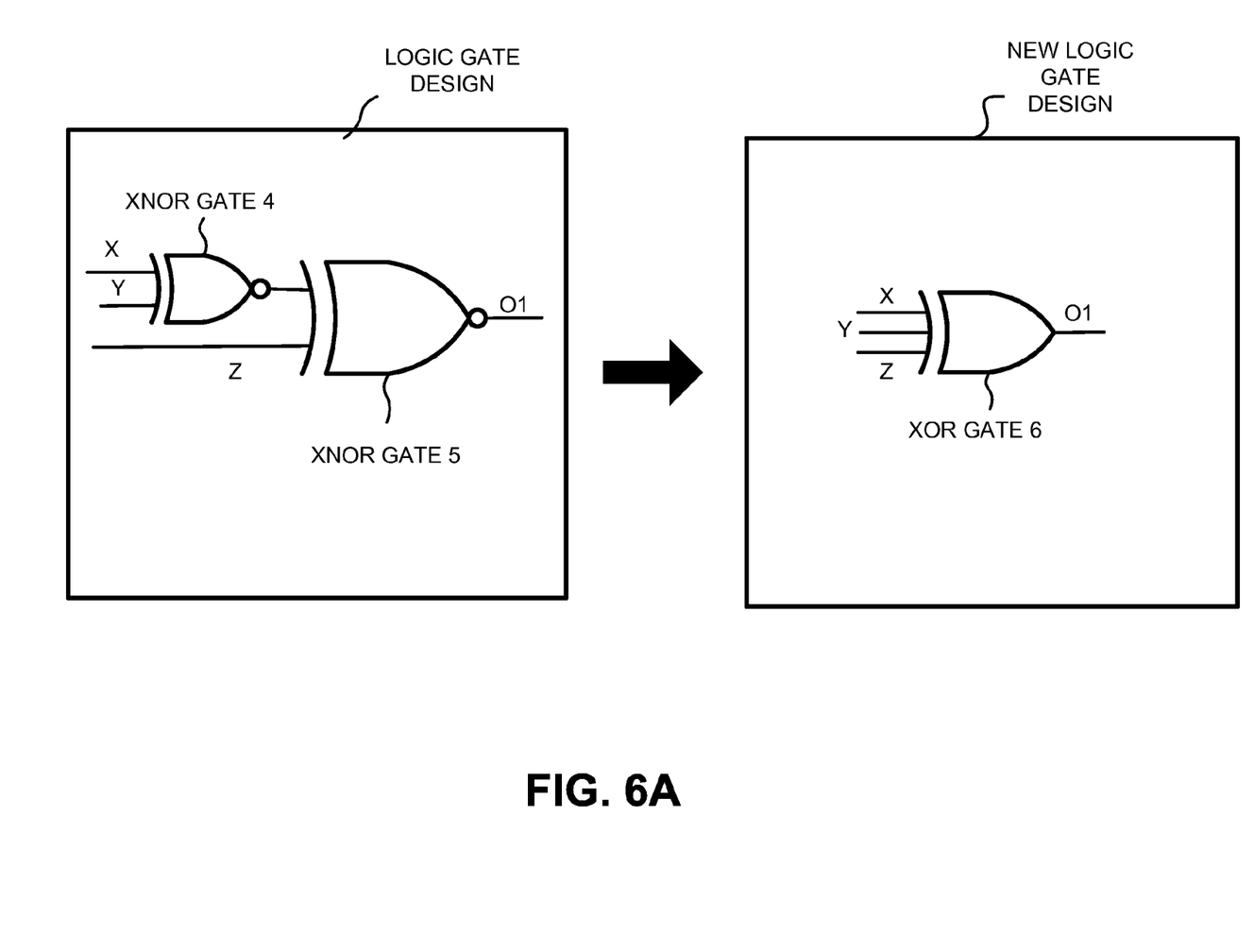
FIGS. 6A-6D are diagrams of example logic gate designs.

FIG. 6A shows an example of a portion of a logic gate design received from gate synthesis application 215. The logic gate design shows two XNOR gates with XNOR gate 4 having inputs X and Y and XNOR gate 5 having input Z and the other input corresponding to the output of XNOR gate 4. XNOR gate 5 may output O1. Analysis application 220 may determine that XNOR gate 4 and XNOR gate 5 can be replaced with a single XOR gate that can provide the same output using the same inputs (X, Y, and Z). This may reduce the affect of toggling of input X, Y, and/or Z on multiple logic gates since the number of inputs (and logic gates) affected by the toggling are reduced. As shown in FIG. 6A, the new gate design shows XOR gate 6 with the three inputs (X, Y and Z) and XOR gate 6 may output O1 which may be the same output as XNOR gate 5.

Figure 6B:
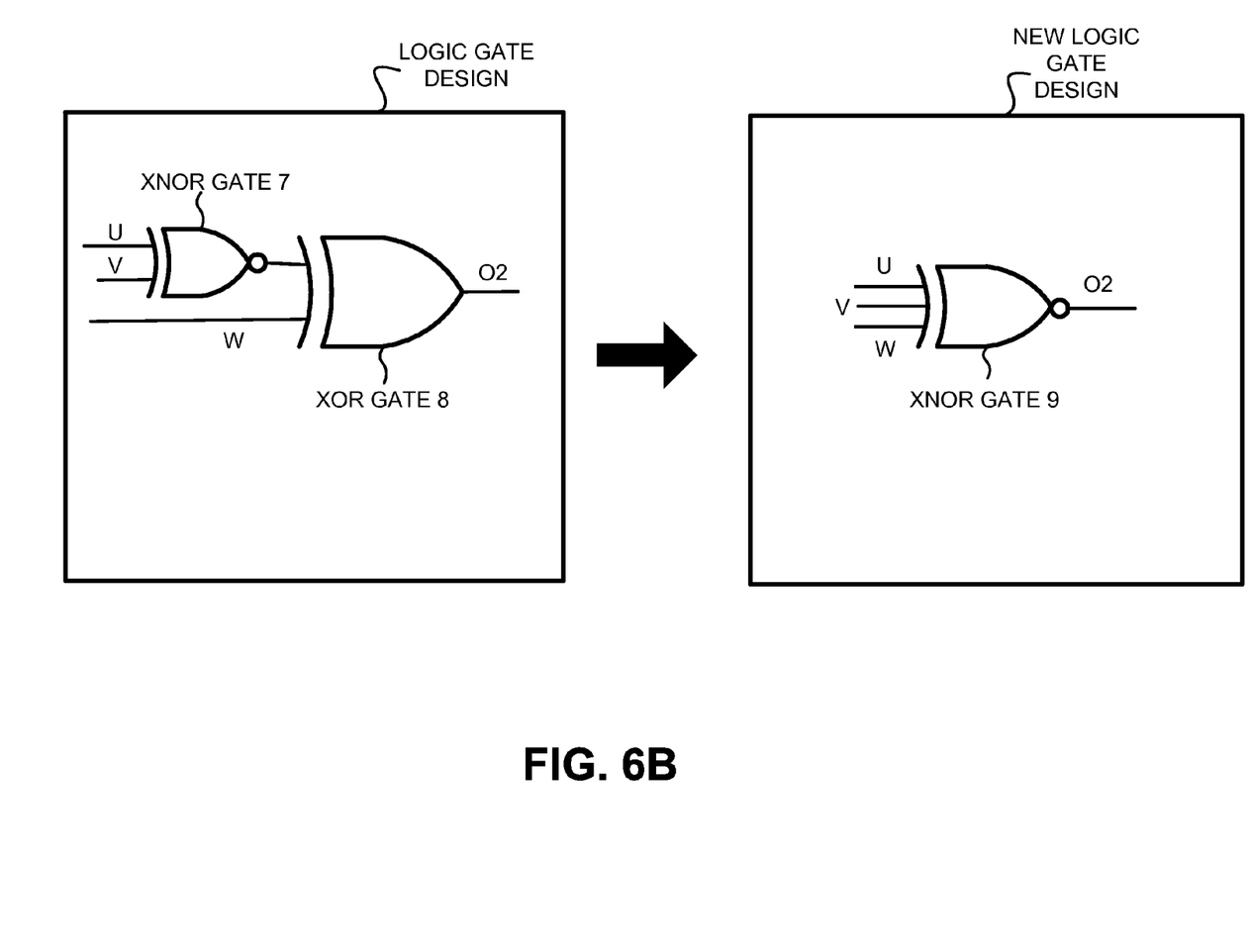

FIG. 6B shows another example of a portion of a logic gate design received from gate synthesis application 215. The logic gate design shows XNOR gate 7 with inputs U and V, and XOR gate 8 with input W and the other input corresponding to output of XNOR gate 7. XOR gate 8 may output O2. Analysis application 220 may determine that XNOR gate 7 and XOR gate 8 can be replaced with a single XNOR gate that can provide the same output using the same inputs (U, V and W). This may reduce the affect of toggling of input U, V, and/or W on multiple logic gates since the number of inputs (and logic gates) affected by the toggling are reduced. As shown in FIG. 6B, the new gate design shows XNOR gate 9 with the same inputs and output O2 which may be the same output as XOR gate 8.

Figure 6C:
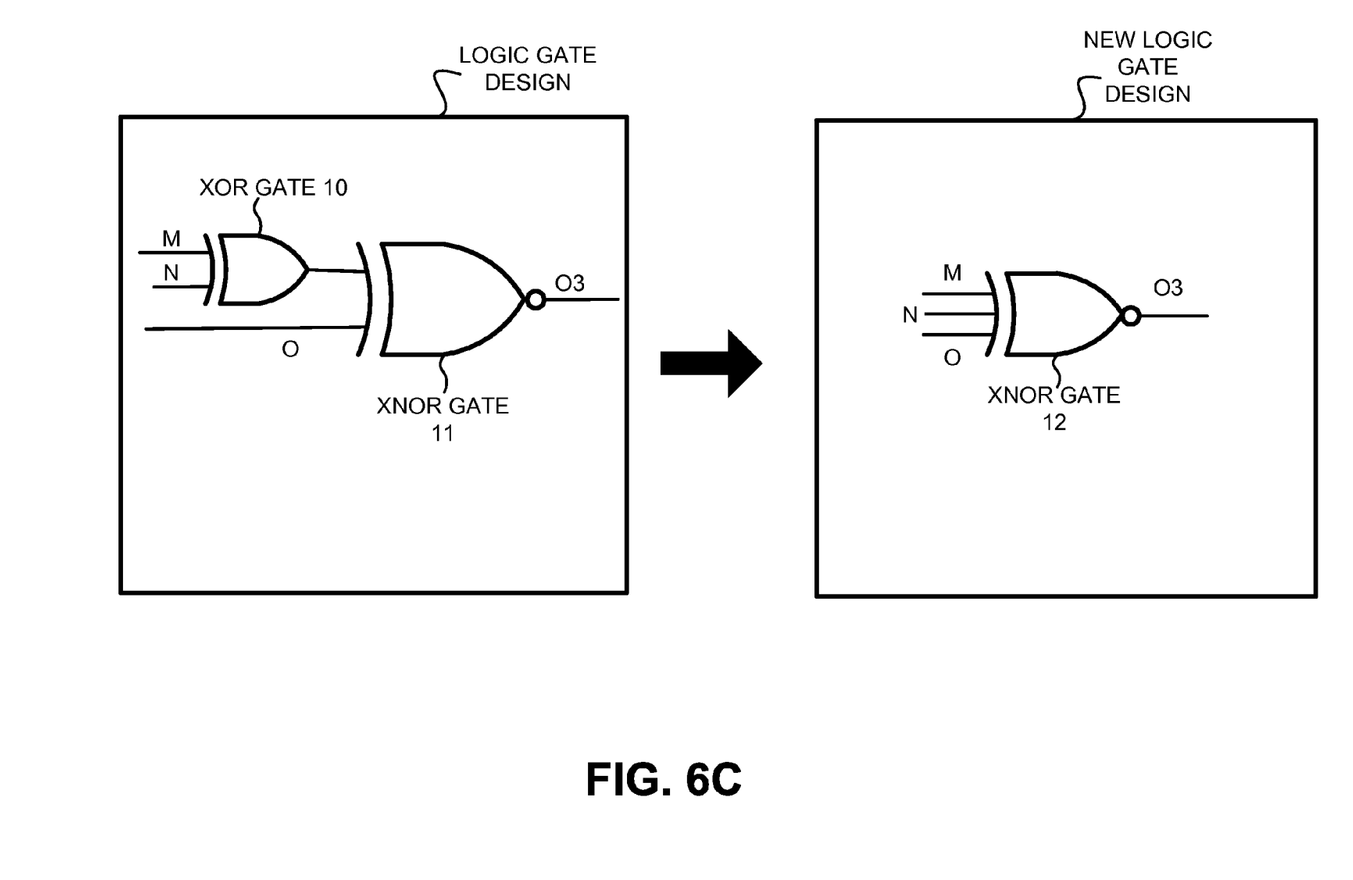

FIG. 6C shows another example of a portion of a logic gate design received from gate synthesis application 215. The logic gate design shows XOR gate 10 with inputs M and N, and XNOR gate 11 with input O and the other input corresponding to the output of XNOR gate 11. XNOR gate 11 may output O3. Analysis application 220 may determine that XOR gate 10 and XNOR gate 11 can be replaced with a single XNOR gate that can provide the same output using the same inputs (M, N, and O). This may reduce the affect of toggling of input M, N, and/or O on multiple logic gates since the number of inputs (and logic gates) affected by the toggling are reduced. As shown in FIG. 6C, the new gate design shows XNOR gate 12 with the same inputs and output O3 which may be the same output as XNOR gate 11.

Figure 6D:
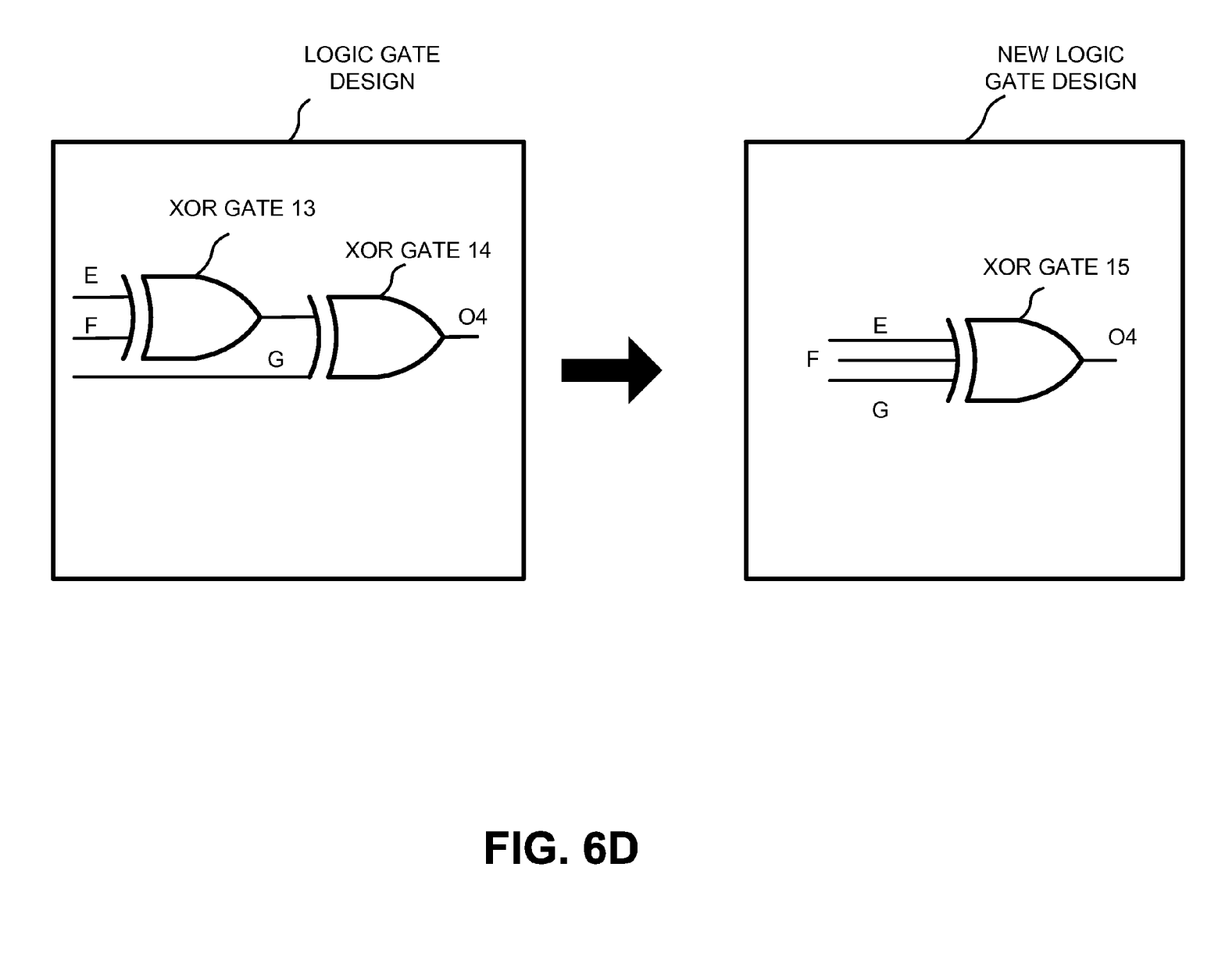

FIG. 6D shows another example of a portion of a logic gate design received from gate synthesis application 215. The logic gate design shows XOR gate 13 with inputs E and F, and XOR gate 14 with input G and the other input corresponding to the output of XOR gate 13. XOR gate 13 may output O4. Analysis application 220 may determine that XOR gate 13 and XOR gate 14 can be replaced with a single XOR gate that can provide the same output using the same inputs (E, F, and G). This may reduce the affect of toggling of input E, F, and/or G on multiple logic gates since the number of inputs (and logic gates) affected by the toggling are reduced. As shown in FIG. 6D, the new gate design shows XOR gate 15 with the same inputs and output O4 which may be the same output as XOR gate 14.

Returning to FIG. 4, the reduction in the number of XOR gates and/or XNOR gates may result in a reduction in the number of logic gates that are affected by toggling of an input. Since fewer XOR gates and/or XNOR gates are affected by toggling of an input, this may result in the amount of capacitance being reduced which results in a reduction in the amount of power being consumed by the logic gate design (since power is proportional to the amount of capacitance). Additionally, the reduction in the number of XOR gates and/or XNOR gates may reduce the amount of wiring that is used to connect XOR gates and/or XNOR gates. Since the amount of wiring is reduced, the amount of capacitance associated with the wiring is also reduced. Since power is a function of capacitance, this may result in the logic gate design consuming less power. Additionally, the reduction in the number of XOR gates and/or XNOR gates may reduce the number of clock tree buffers in the logic gate design and this may result in the logic gate design consuming less power.

Additionally, the reduction in the number of XOR gates and/or XNOR gates may also reduce the number of decoupling capacitors (used to reduce power supply noise) in the logic gate design and this may result in the logic gate design consuming less power. Additionally, reducing the number of XOR gates and/or XNOR gates that are affected by toggling of an input may result in a decrease in the size of the logic gate design. The decrease in the size of the logic gate design may result in a reduction in the amount of time associated with data having to traverse the logic gate design.

Process 400 may include changing the location of inverters in the logic gate design (block 440). For example, analysis application 220 may determine that one or more inverters in the logic gate design may be re-located to a different part of the logic gate design. An inverter may be associated with the toggling of an input in the logic gate design. By changing the number of inputs associated with the toggling activity (described with regard to block 430), the location of one or more inverters in the logic gate design may also be changed.

Figure 7A:
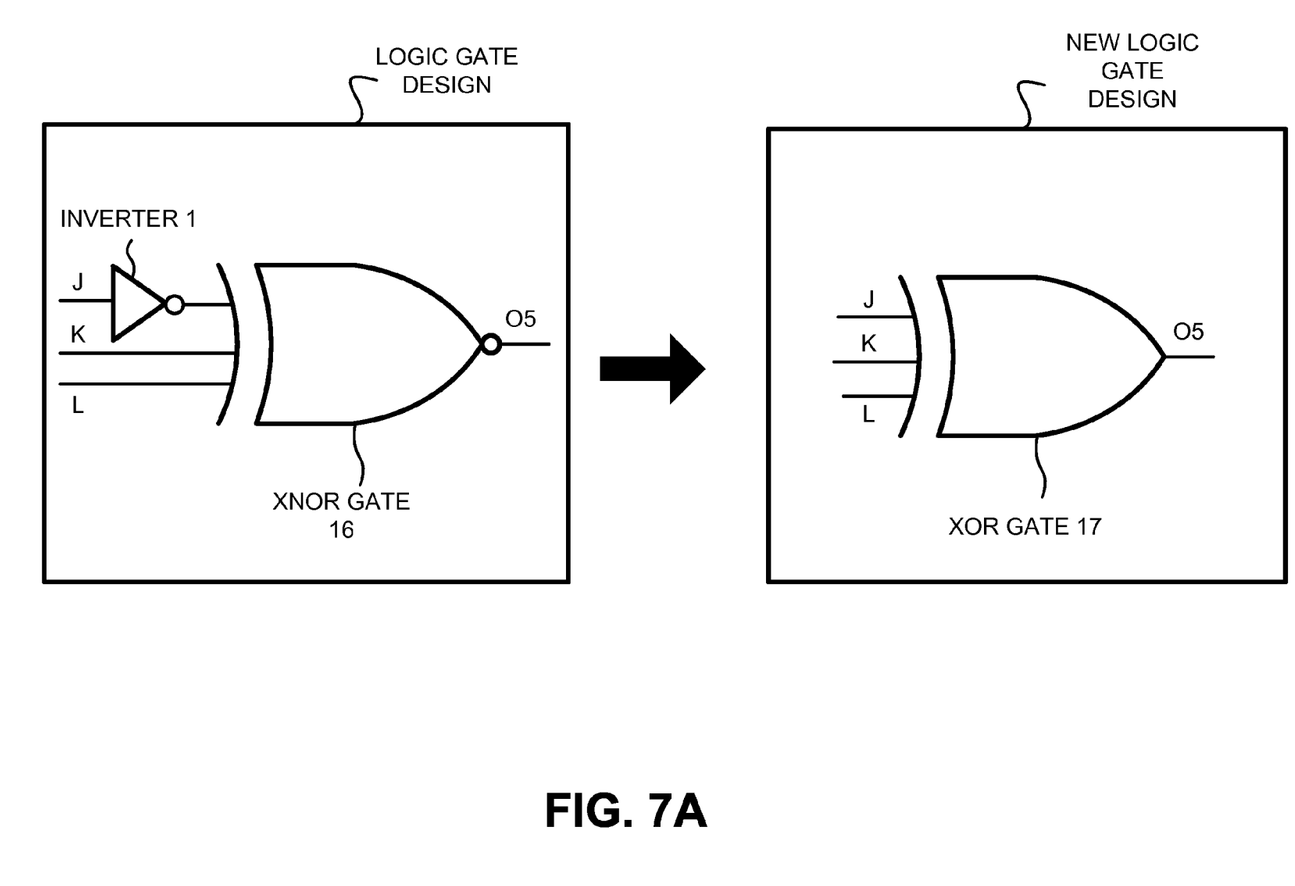
FIGS. 7A-7B are diagrams of example logic gate designs.
Figure 7B:
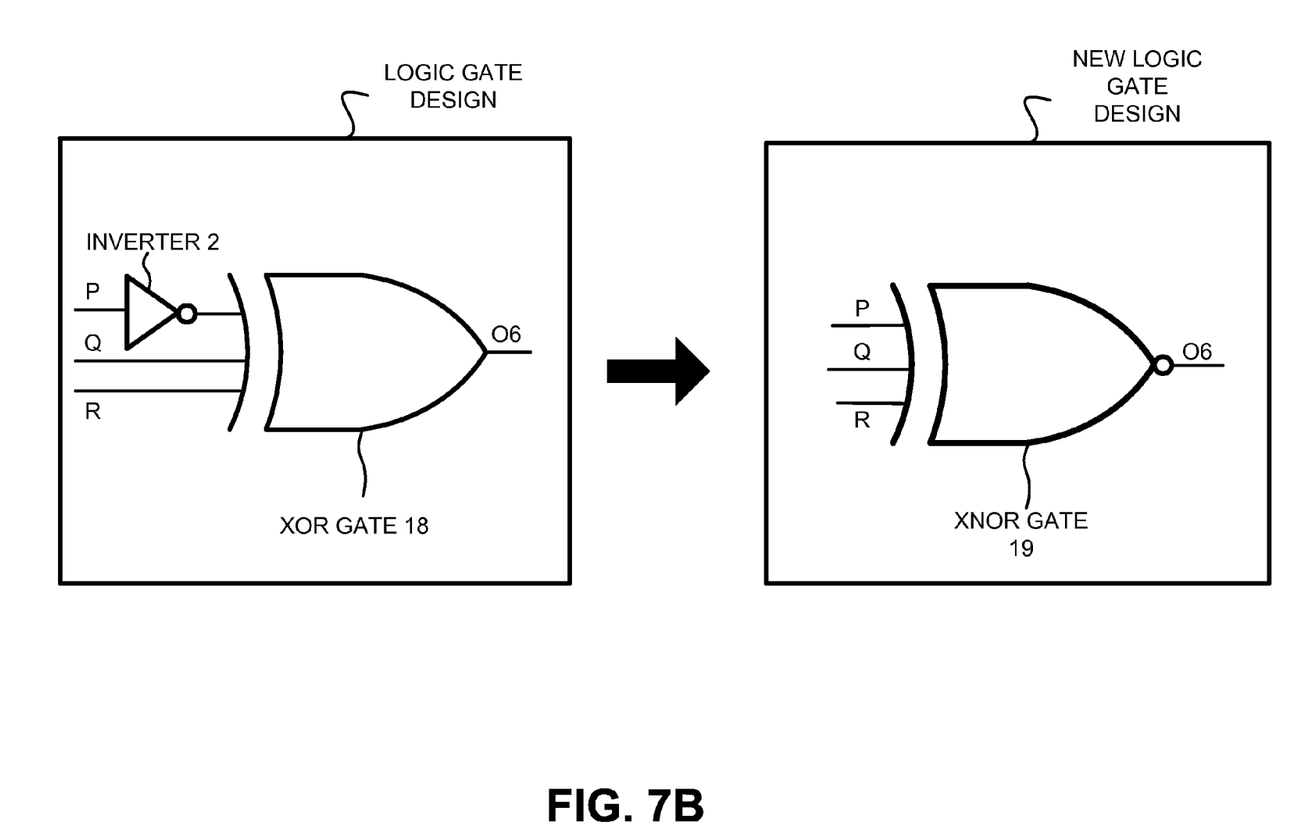

FIGS. 7A-7B are examples of portions of logic gate designs. For FIGS. 7A-7B, assume that each input is being sent from a different flip-flop. FIG. 7A shows an example of a portion of a logic gate design received from gate synthesis application 215. The logic gate design includes XNOR gate 16 with inputs J, K, and L and an output of O5. Inverter 1 is placed on input J. Analysis application 220 may determine that inverter 1 can be placed at the output of the logic gate. To simulate placing inverter 1 at the output of the logic gate, analysis application 220 may change XNOR gate 16 to XOR gate 17. As shown in FIG. 7A, the new logic gate design shows XOR gate 17 with the three same inputs (J, K, and L) and output O5 which may be the same as the output of XNOR gate 16.

FIG. 7B shows an example of a portion of a logic gate design received from gate synthesis application 215. The logic gate design includes XOR gate 15 with inputs P, Q, and R and an output O6. Inverter 2 is placed on input P. Analysis application 220 may determine that inverter 2 can be placed at the output of the logic gate. To simulate placing inverter 2 at the output of the logic gate, analysis application 220 may change XOR gate 18 to XNOR gate 19. As shown in FIG. 7B, the new logic gate design shows XNOR gate 19 with the three same inputs (P, Q, and R) and the output O6 which may be the same as the output of XOR gate 18.

Returning to FIG. 4, process 400 may include outputting a new logic gate design (block 450). Analysis application 220 may generate a new logic gate design based on changing the logic gate design received from gate synthesis application 215 (described with regard to blocks 430 and/or 440). The new logic gate design may consume less power (than the received logic gate design) based on the new logic gate design having fewer logic gates, fewer clock buffers, fewer wiring, fewer decoupling capacitors, and/or other fewer components described with regard to block 430. Additionally, the new logic gate design may use less power since fewer logic gates are affected by toggling of an input, as described above. Additionally, the new logic gate design may be smaller in size than the received logic gate design resulting in less time to traverse the new logic gate design than the received logic gate design.

Analysis application 220 may verify that the new logic gate design provides the same functionality as that of the received logic gate design. If analysis application 220 does not verify that the new logic gate design provides the same functionality as that of the logic gate design, then analysis application 220 may analyze the logic gate design in a manner similar to that described with regard to blocks 420-440 so that the new logic gate design provides the same functionality as that of the received logic gate design. Alternatively, the user may be provided with the option (e.g., a message displayed on computing device 210) to synthesize a new logic gate design using gate synthesis application 215.

If analysis application 220 verifies that the new logic gate design provides the same functionality as that of the logic gate design, then analysis application 220 may send the new logic gate design to placement device 225. Placement device 225 may receive the new logic gate design and create a layout design. Placement device 225 may determine the layout design based on the new logic gate design. Placement device 225 may determine the placement of various components (e.g., transistors, diodes, clocks, logic gates, etc.) of the ASIC in the layout design. Additionally, placement device 225 may determine the wiring design associated with connecting the various components of the ASIC in the layout design. In some implementations, placement device 225 may generate a physical ASIC based on the layout design and/or sending the layout design to a manufacturing facility (e.g., a foundry) for production.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

While the above examples have been used to describe reducing the power consumption by an ASIC used in a FEC encoder and/or FEC decoder, the above examples may be used to reduce the power consumption by an ASIC used in other types of devices (e.g., modulators, transmitters, mulitplexers, digital signal processors, network devices, telecommunication devices, etc.). Additionally, the above example may be used to describe reducing the power consumption by integrated circuits (ICs) and/or other types of circuitry.

The foregoing disclosure provides illustration and description, but is not intended to be exhaustive or to limit the embodiments to the precise form disclosed. Modifications and variations are possible in light of the above disclosure or may be acquired from practice of the embodiments.

As used herein, the term "component" is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
analyzing, by a computing device, a logic gate design, of an application specific integrated circuit, having a plurality of logic gates;
identifying, by the computing device, logic gates, of the plurality of logic gates, that are affected by toggling activity associated with an input of one or more of the plurality of logic gates;
replacing, by the computing device and within the logic gate design, the identified logic gates with different logic gates that are not affected by the toggling activity,
 a quantity of the different logic gates being smaller than a quantity of the identified logic gates; and
outputting, by the computing device, a new logic gate design for the application specific integrated circuit based on replacing the identified logic gates with the different logic gates,
the application specific integrated circuit, with the new logic gate design, consuming less power than the application specific integrated circuit with the logic gate design.

2. The method of claim 1, further comprising:
reducing a quantity of clock buffers in the logic gate design based on replacing the identified logic gates with the different logic gates,
 the reduction in the quantity of clock buffers resulting in the application specific integrated circuit, with the new logic gate design, using less power than the application specific integrated circuit with the logic gate design.

3. The method of claim 1, further comprising:
reducing an amount of capacitance in the logic gate design based on replacing the identified logic gates with the different logic gates,
 the reduction in the amount of capacitance resulting in the application specific integrated circuit, with the new logic gate design, consuming less power than the application specific integrated circuit with the logic gate design.

4. The method of claim 1, further comprising:
reducing a quantity of inverters in the logic gate design,
the reduction in the quantity of inverters resulting in the application specific integrated circuit, with the new logic gate design, consuming less power than the application specific integrated circuit with the logic gate design.

5. The method of claim 1, further comprising:
verifying that the new logic gate design provides a same output as the logic gate design based on same inputs; and
 sending the new logic gate design to a placement device, based on verifying that the new logic gate design provides the same output,
the placement device producing a layout design for the new logic gate design.

6. The method of claim 1, where the plurality of logic gates includes a plurality of XOR gates and a plurality of XNOR gates, and
where replacing the identified logic gates with the different logic gates includes:
replacing a pair of logic gates, of the plurality of logic gates, with a single logic gate,
where replacing the pair of logic gates with the single logic gate includes:
replacing a pair of XNOR gates, of the plurality of XNOR gates, with a single XOR gate, replacing a XNOR gate, of the plurality of XNOR gates, and a XOR gate, of the plurality of XOR gates, with a single XNOR gate or replacing a pair of XOR gates, of the plurality of XOR gates with a single XOR gate.

7. A system comprising:

a computing device configured to:

analyze a logic gate design, of an application specific integrated circuit, having a plurality of logic gates;

identify logic gates, of the plurality of logic gates, that are affected by toggling activity associated with an input of one or more of the plurality of logic gates;

replace, within the logic gate design, the identified logic gates with different logic gates that are not affected by the toggling activity, a quantity of the different logic gates being smaller than a quantity of the identified logic gates; and output a new logic gate design for the application specific integrated circuit based on replacing the identified logic gates with the different logic gates, the application specific integrated circuit, with the new logic gate design, producing a same output as the application specific integrated circuit with the logic gate design, based on same inputs.

8. The system of claim 7, where the application specific integrated circuit with the new logic gate design consumes less power than the application specific integrated circuit with the logic gate design.

9. The system of claim 7, where the logic gate design and the new logic gate design are associated with a forward error correction decoder.

10. The system of claim 7, the computing device is further configured to:

reduce an amount of wiring in the logic gate design based on replacing the identified logic gates with the different logic gates, the reduction in the amount of wiring resulting in the application specific integrated circuit, with the new logic gate design, consuming less power than the application specific integrated circuit with the logic gate design.

11. The system of claim 7, the computing device is further configured to:

reduce an amount of time associated with information passing through the new logic gate design based on replacing the identified logic gates with the different logic gates.

12. The system of claim 7, the computing device is further configured to:

reduce a quantity of decoupling capacitors based on replacing the identified logic gates with the different logic gates, the reduction in the quantity of decoupling capacitors resulting in the application specific integrated circuit, with the new logic gate design, consuming less power than the application specific integrated circuit with the logic gate design.

13. The system of claim 7, where the plurality of logic gates includes a plurality of XOR gates and a plurality of XNOR gates, and where, when replacing the identified logic gates with the different logic gates, the computing device is configured to:

replace a pair of logic gates, of the plurality of logic gates, with a single logic gate, and where, when replacing the pair of logic gates with the single logic gate, the computing device is to:

replace a pair of XNOR gates, of the plurality of XNOR gates, with a single XOR gate, replace a XNOR gate, of the plurality of XNOR gates, and a XOR gate, of the plurality of XOR gates, with a single XNOR gate or replace a pair of XOR gates, of the plurality of XOR gates with a single XOR gate.

14. The system of claim 7, the computing device is further configured to:

verify that the new logic gate design provides the same output as the logic gate design based on the same inputs; and send the new logic gate design, based on verifying that the new logic gate design provides the same output of the logic gate design, to a placement device, the placement device producing a layout design for the new logic gate design.

15. A non-transitory computer-readable medium comprising:

a plurality of instructions that, when executed by one or more processors of a computing device, cause the one or more processors to:

analyze a logic gate design, of an application specific integrated circuit, having a plurality of logic gates, the plurality of logic gates including a plurality of XOR gates and a plurality of XNOR gates;

identify logic gates, of the plurality of logic gates, that are affected by toggling activity associated with an input of one or more of the plurality of logic gates;

replace, within the logic gate design, the identified logic gates with different logic gates that are not affected by the toggling activity, a quantity of the different logic gates being smaller than a quantity of the identified logic gates; and output a new logic gate design for the application specific integrated circuit based on replacing the identified logic gates with the different logic gates, the application specific integrated circuit, with the new logic design, being smaller in size than the application specific integrated circuit with the logic gate design.

16. The non-transitory computer-readable medium of claim 15, further comprising:

one or more instructions that, when executed by the one or more processors, cause the one or more processors to:

reduce a number of decoupling capacitors based on replacing the identified logic gates with the different logic gates, the reduction in the number of decoupling capacitors resulting in the application specific integrated circuit, with the new logic gate design, consuming less power than the application specific integrated circuit with the logic gate design.

17. The non-transitory computer-readable medium of claim 15, further comprising:

one or more instructions that, when executed by the one or more processors, cause the one or more processors to:

reduce a number of clock buffers based on replacing the identified logic gates with the different logic gates, the reduction in the number of clock buffers resulting in the application specific integrated circuit, with the new logic gate design, consuming less power than the application specific integrated circuit with the logic gate design.

18. The non-transitory computer-readable medium of claim 15, where the application specific integrated circuit, with the new logic gate design, consumes less power than the application specific integrated circuit with the logic gate design.

19. The non-transitory computer-readable medium of claim 15, further comprising:
one or more instructions that, when executed by the one or more processors, cause the one or more processors to:
reduce a quantity of inverters in the logic gate design,
the reduction in the quantity of inverters resulting in the application specific integrated circuit, with the new logic gate design, consuming less power than the application specific integrated circuit with the logic gate design.

20. The non-transitory computer-readable medium of claim 15, further comprising:
one or more instructions that, when executed by the one or more processors, cause the one or more processors to:
reduce an amount of wiring in the logic gate design based on replacing the identified logic gates with the different logic gates,
the reduction in the amount of wiring resulting in the application specific integrated circuit, with the new logic gate design, consuming less power than the application specific integrated circuit with the logic gate design.

* * * * *